Patented May 4, 1943

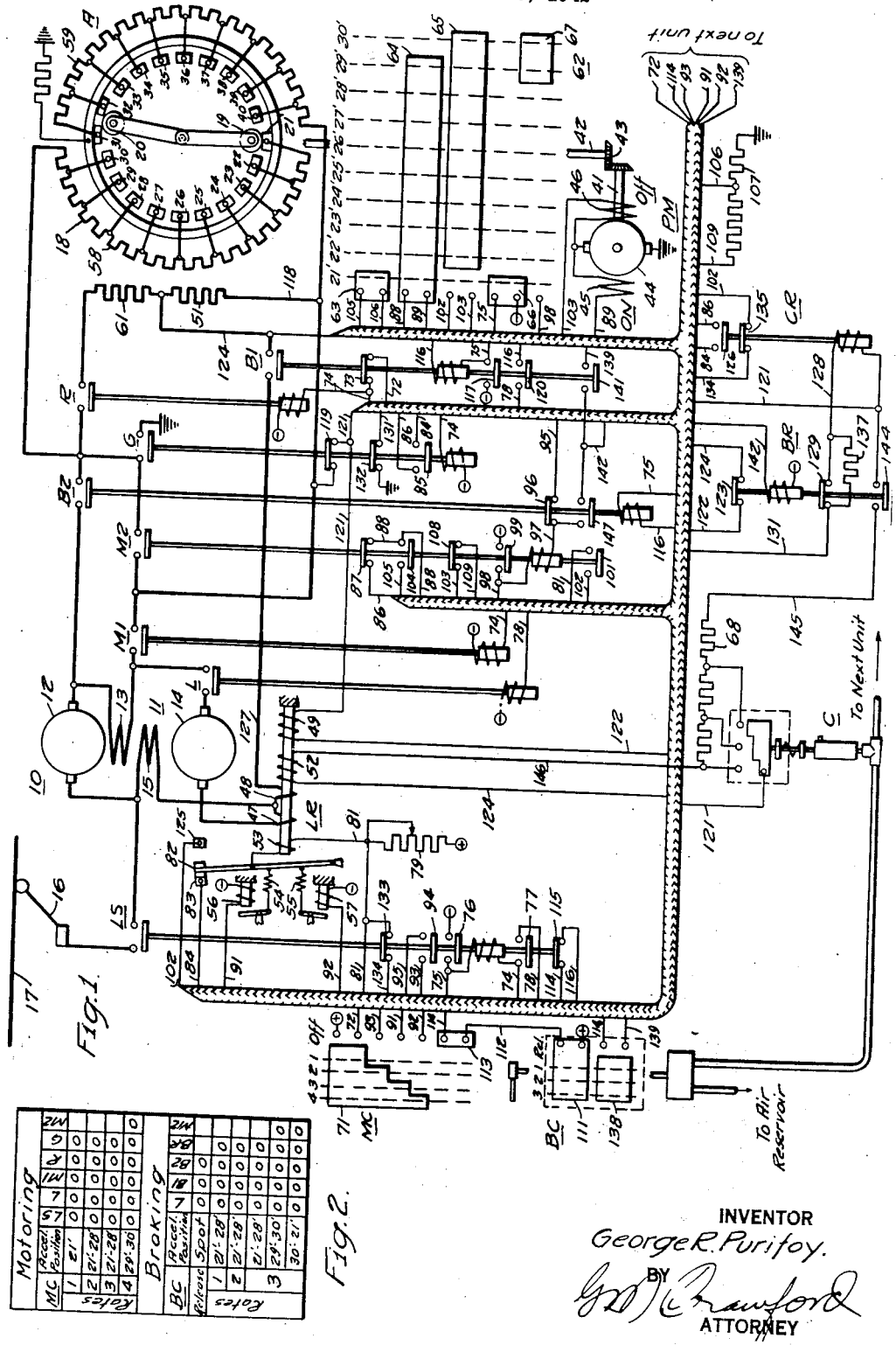

2,318,330

UNITED STATES PATENT OFFICE 2,318,330

MOTOR CONTROL AND BRAKE SYSTEM

George R. Purifoy, Pittsburgh, Pa., assignor to Westinghouse Electric & Manufacturing Company, East Pittsburgh, Pa., a corporation of Pennsylvania Application March 19, 1942, Serial No. 435,378

8 Claims. (Cl. 192—2)

My invention relates, generally, to motor control systems and, more particularly, to systems for automatically controlling the acceleration and the deceleration of the propelling motors of electric vehicles.

An object of my invention, generally stated, is to provide an automatic control system for electrically-propelled vehicles which shall be simple and efficient in operation and which may be economically manufactured and installed.

A more specific object of my invention is to provide a system suitable for controlling the operation of a single car or two or more cars operating in multiple.

Another object of my invention is to coordinate the electrical-brake and the air-brake systems of an electrically-propelled vehicle.

A further object of my invention is to provide means for automatically changing the rate of dynamically braking an electrically-propelled vehicle.

A still further object of my invention is to provide for controlling the dynamic braking rate of a plurality of electrically-propelled cars operating in multiple without increasing the number of train line wires required.

Still another object of my invention is to provide for changing the dynamic braking rate of vehicles controlled by either unit switch control or multi-notch accelerator control.

Other objects of my invention will be explained fully hereinafter or will be apparent to those skilled in the art.

In accordance with one embodiment of my invention, both the acceleration and the deceleration of electrically-propelled vehicles are automatically controlled by variable rate current limit relays, the setting of which may be adjusted while the vehicles are in operation. The accelerating rate is controlled by means of a master controller and the dynamic braking rate is controlled by means of variable pressure relays operating from the air-brake system, thereby coordinating the electric-brake and the air-brake systems.

For a fuller understanding of the nature and objects of my invention reference may be had to the following detailed description, taken in conjunction with the accompanying drawing, in which:

Figure 1 is a diagrammatic view of a control system embodying my invention, and

Fig. 2 is a chart showing the sequence of operation of a portion of the apparatus illustrated in Fig. 1.

Referring to the drawing, a pair of electric motors 10 and 11 may be utilized for propelling a vehicle (not shown). The motor 10 is provided with an armature winding 12 and a series field winding 13. Likewise, the motor 11 is provided with an armature winding 14 and a series field winding 15. A line switch LS is provided for connecting the motors 10 and 11 to a trolley 16 which engages a power conductor 17 that may be energized from any suitable source of power, such as a generating station (not shown).

The motors 10 and 11 are connected in parallel-circuit relation during acceleration of the vehicle and they may also be connected for dynamic braking with the field winding 15 of motor 11 connected across the armature 12 of motor 10 and the field winding 13 of motor 10 connected across the armature 14 of motor 11, thereby permitting the current in the armature windings to reverse and cause the motors to act as generators and decelerate the vehicle. A pair of switches B1 and B2 is provided for establishing the dynamic braking connections.

Both the acceleration and deceleration of the motors 10 and 11 are primarily controlled by a motor driven accelerator A which is of the same general type as the one described in Patent No. 1,991,229, issued February 12, 1935, to L. G. Riley, and assigned to the Westinghouse Electric & Manufacturing Company. The accelerator A comprises a circular bus 18 inside of which is disposed a plurality of contact fingers 21 to 40, inclusive, which are progressively forced against the bus 18 by a pair of revolving rollers 19 and 20.

The rollers 19 and 20 are driven by a pilot motor PM through shafts 41 and 42 connected by bevelled gears 43. The pilot motor PM is provided with an armature winding 44 and two field windings 45 and 46, one for each direction of rotation of the motor. The energy for operating the pilot motor and the control apparatus may be supplied by a battery or other suitable source of control energy.

A limit relay LR is provided for controlling the operation of the pilot motor PM during both acceleration and deceleration of the vehicle. As shown, the relay LR is provided with several different actuating coils which function to operate the relay during coasting of the vehicle as well as during acceleration and dynamic braking. Thus a coil 47 is connected in the motor circuit during acceleration, and an additional coil 48 is connected in the motor circuit during dynamic braking of the vehicle. A spotting coil 49 is connected across a resistor 51 to be energized in accordance with the motor current during coasting of the vehicle, thereby providing means of spotting the accelerator A, as will be described more fully hereinafter. A rate coil 52 is connected across the resistor 51 during dynamic braking for controlling the braking rate, as will be more fully described hereinafter. The relay LR is also provided with a tickler coil 53 which functions to cause a vibratory action of the relay in a manner well known in the art.

In order to provide for changing the setting of the relay LR, thereby governing the rate of acceleration of the vehicle by varying the speed of the pilot motor PM which, in turn, controls the rate at which resistance is shunted from the motor circuit to vary the motor current, electromechanical means comprising a pair of springs 54 and 55 and a pair of electromagnets 56 and 57 for tightening the springs 54 and 55, respectively, is provided. As fully described in Patent No. 2,254,911, issued September 2, 1941 to L. G. Riley, the energization of the electromagnets 56 and 57 is controlled by a manually operable master controller MC, thereby permitting the operator to vary the rate of acceleration of the vehicle as desired.

The accelerator A is provided with resistors 58 and 59 for controlling the current in the motors 10 and 11. The resistor 58 is divided into a number of subdivisions which are connected to the contact fingers 21 to 30, inclusive, and the resistor 59 is divided into subdivisions which are connected to the contact fingers 31 to 40, inclusive. In the present system, the resistors 58 and 59 are connected in the motor circuit in series-circuit relation during both acceleration and dynamic braking, thereby making it unnecessary to change the resistor connections when transferring from motoring to braking operation.

As described in the aforesaid Patent No. 2,254,911, the resistor 51 and an additional resistor 61 are connected in the motor circuit in parallel-circuit relation to the resistors 58 and 59 during the motoring operation. Since part of the motor current is diverted through the resistors 51 and 61, the heating effect on the accelerator is reduced and also arcing of the contact fingers on the accelerator is reduced.

As shown, the accelerator A is provided with a drum switch 62 having a plurality of contact segments 63 to 67, inclusive, and cooperating contact fingers which engage the contact segments as the accelerator is driven by the shaft 42. The reference numerals 21' to 30' indicate the contact fingers over which the roller 19 travels while the contact segments are engaged by their respective contact fingers. It will be seen that the roller 20 travels over fingers 31 to 40 while the roller 19 travels over fingers 21 to 30. The function of the different segments of the drum switch 62 will be explained more fully hereinafter.

In addition to the accelerator and the control switches previously mentioned, numerous other switches are provided and perform certain switching operations. These include a switch L for connecting the motors in parallel-circuit relation, a switch M1 for connecting the motors to the accelerator during acceleration of the vehicle, a switch G for connecting the accelerator resistors to ground during acceleration, a switch M2 for connecting the motors directly to ground through the switch G after the accelerator resistors have been shunted from the motor circuit by the accelerator rollers, and a switch R for connecting the resistors 51 and 61 in the motor circuit during acceleration, as previously described.

In order to permit the present system to be utilized on cars which are operated in multiple-unit trains and controlled from one control station at the head of the train, a braking relay BR is provided. The relay BR permits dynamic braking to be established simultaneously on all the cars of a train. The energization of the relay BR is controlled by a braking controller BC which may also be utilized to control the air-brake system (not shown). Thus when the braking controller at the head of the train is operated, all of the relays BR throughout the train are energized to permit dynamic braking to be established on all the motors in the train. The controllers MC and BC are electrically interlocked to prevent improper operation of the equipment.

As described in the aforesaid Patent No. 2,254,911, a coasting relay CR is utilized to provide smoother operation of multiple-unit trains when power is reapplied to the motors in the train after a stop has been made by means of dynamic braking. The actuating coil of the relay CR is energized only during spotting or braking of the train and the relay functions to prevent the accelerator from starting to advance while the train is standing still since the coil of the relay CR is responsive to the counter-electromotive force of the motor.

It has been found that in multiple-unit trains the accelerators may start spotting as a result of the operation of the limit relay LR if the operator moves the braking controller to the "off" position while the train is standing still. Thus, when power is reapplied to the motors by operating the master controller, the accelerators may not all be in the correct position for the reapplication of power, thereby resulting in rough or uneven operation of the train. Since the relay CR is responsive to the motor speed, its contact members are so connected in the motor circuit that the advancement of the accelerator is prevented while the train is standing still.

In order to coordinate the operation of the air-brake system and the dynamic braking of the vehicles, an air-operated relay C is provided on each vehicle of a train. As indicated in the drawing, the relays C are connected to the air line of the air-brake system and each relay is, therefore, responsive to the airbrake pressure which is controlled by the braking controller BC. The relay C is provided with contact members which successively shunt portions of a resistor 68 from the circuit for the rate coil 52 on the limit relay LR. In this manner the operation of the relay LR, and hence the rate of dynamic braking is controlled by the relay C which is responsive to the air-brake pressure.

Since the maximum effect of the air-brake system is obtained by supplying maximum air pressure to the braking system, it will be seen that the maximum effect of the electrical or dynamic braking system is likewise obtained as a result of the application of maximum air pressure to the braking system. The relay C is so constructed that more of the resistor 68 is shunted from the circuit for the rate coil 52 as the air pressure increases, thereby changing the setting of the relay LR to permit an increase in the braking current and the braking effect of the motors. In this manner, the electrical or dynamic braking system is coordinated with the air-brake system and both systems are under the control of the operator at all times.

In order that the functioning of the foregoing apparatus may be more clearly understood the operation of the system will now be described in more detail. Assuming that it is desired to accelerate the vehicle at the maximum rate, the master controller MC is actuated to position 4, thereby applying power to the motors 10 and 11.

When the controller MC is actuated to position 1, the switches LS, L, M1, R and G are closed to connect the motors 10 and 11 to the power source in series-circuit relation with the resistors 58 and 59 of the accelerator A. The energizing circuit for the actuating coil of the switch LS may be traced from positive through a contact segment 71 of the controller MC, conductor 72, an interlock 73 on the switch B1, conductor 74, the actuating coil of the switch LS, conductor 75 and the contact segment 66 of the drum switch 62 on the accelerator A to negative. Following the closing of the switch LS, a holding circuit for the actuating coil is established through an interlock 76 to negative.

The energizing circuit for the switch L is also established by the closing of the switch LS. This circuit extends from the conductor 74 through an interlock 77 on the switch LS, conductor 78 and the actuating coil of the switch L to negative. The energizing circuit for the switch M1 extends from the conductor 74, through the actuating coil of the switch M1 to negative. Likewise, the energizing circuit for the switch R extends from the conductor 74, through the actuating coil of the switch R to negative. The energizing circuit for the switch G also extends from the conductor 74, through the actuating coil of the switch to negative.

As explained hereinbefore, the resistors 51 and 61 are connected in the motor circuit in parallel-circuit relation to the resistors of the accelerator A during the motoring operation, thereby reducing the duty imposed upon the accelerator and also making it possible to connect the resistors 58 and 59 of the accelerator in series-circuit relation during motoring as well as during dynamic braking which simplifies the switching operations necessary to establish dynamic braking of the motors. The resistors 51 and 61 are connected in the motor circuit by the closing of the switch R.

Further acceleration of the motors 10 and 11 is controlled by the accelerator A which is driven by the pilot motor PM under the control of the limit relay LR. The pilot motor is energized at this time through a circuit which may be traced from positive, through a resistor 79, conductor 81, the tickler coil 53 of the relay LR, contact members 82 and 83 of the relay LR, conductor 84, an interlock 85 on the switch G, conductor 86, an interlock 87 on the switch M2, conductor 88, the segment 64 of the drum switch 62 on the accelerator A, conductor 89, the field winding 45 of the pilot motor PM and the armature winding 44 to ground.

As explained hereinbefore, the pilot motor PM advances the accelerator A under the control of the limit relay LR, the operation of which is governed by the motor current. The coil 47 of the relay LR is connected in the circuit for the motor 11 during acceleration and is, therefore, responsive to the motor current.

Since it has been assumed that the master controller MC is actuated to position 4, both of the electromagnets 56 and 57 are energized to apply tension to the springs 54 and 55, respectively, thereby increasing the current required to operate the relay LR which, in turn, increases the current supplied to the motors 10 and 11 to increase the rate of acceleration. The energizing circuit for the electromagnet 56 may be traced from the controller MC, through conductor 91 and the coil of the electromagnet 56 to negative. The energizing circuit for the electromagnet 57 extends from the controller MC, through conductor 92 and the coil of the magnet 57 to negative.

When the accelerator A nears the end of its travel in the forward direction, the switch M2 is closed to connect the motors 10 and 11 directly to ground. The energizing circuit for the actuating coil of the switch M2 may be traced from the controller MC, through conductor 93, an interlock 94 on the switch LS, conductor 95, an interlock 96 on the switch B2, conductor 97, the actuating coil of the switch M2, conductor 98 and the contact segment 67 of the drum switch 62 to negative. A holding circuit for the coil of the switch M2 is established through an interlock 99 carried by the switch M2.

The closing of the switch M2 connects the motors 10 and 11 directly to ground through the switch G, thereby permitting the accelerator A to be returned to its initial position in preparation for the establishment of the dynamic braking circuit for the motors. The closing of the switch M2 opens its interlock 87, thereby interrupting the energizing circuit for the pilot motor which operated the motor in the forward direction. Furthermore, the closing of the switch M2 energizes the "off" field winding 46 of the pilot motor, thereby causing it to operate in the reverse direction to return the accelerator A to its initial position. At this time, the energizing circuit for the pilot motor may be traced from positive, through the resistor 79, conductor 81, an interlock 101 on the switch M2, conductor 102, the contact segment 65 of the drum switch 62, conductor 103, the field winding 46 of the pilot motor PM and the armature winding 44 to ground.

As the pilot motor approaches its initial position, the motor is deenergized by the interruption of the circuit through the segment 65 of the drum switch 62. Furthermore, an electrical braking circuit is established for the motor to bring it to a quick stop at the end of its travel. The braking circuit may be traced from one terminal of the armature 44, through the field winding 45, conductor 89, the contact segment 64 of the drum switch 62, conductor 88, an interlock 104 on the switch M2, conductor 105, the segment 63 of the drum switch 62, conductor 106, a portion of a resistor 107 and thence to the other terminal of the armature winding 44, through the ground connection.

A similar braking circuit for the motor PM was established upon the interruption of power to the motor by the opening of the contact members of the limit relay during the operation of the accelerator in the forward direction. This braking circuit may be traced from the one terminal of the armature winding 44, through the field winding 46 of the motor, conductor 103, an interlock 108 on the switch M2, conductor 109, the resistor 107 and thence to the other terminal of the armature winding 44, through the ground connection.

If it is desired to permit the vehicle to coast the motors 10 and 11 may be disconnected from the power source by actuating the controller MC to the "off" position, thereby deenergizing the actuating coils for the switches LS, L, M1, R, G and M2. When the controller MC is returned to the "off" position, the switches B1, B2 and L are closed to establish a dynamic braking circuit for the motors provided the accelerator A has returned to its initial position to insert the full amount of its resistance in the motor circuit. In this manner, a small amount of current is permitted to circulate through the motors during coasting of the vehicle as described in Patent No. 2,078,684, issued April 27, 1937, to L. G. Riley. However, the circulating current is of such a low value that it does not materially affect the coasting characteristics of the vehicle. The energizing circuit for the actuating coil of the switch B1 may be traced from positive, through a contact segment 111 on the controller BC which is in the "release" position, conductor 112, a segment 113 on the controller MC, conductor 114, an interlock 115 on the switch LS, conductor 116, the actuating coil of the switch B1, conductor 75 and the segment 66 on the drum switch 62 to negative. The energizing circuit for the actuating coil of the switch B2 extends from the conductor 116, through the coil of the switch B2 and thence to negative through conductor 75 and the segment 66, as previously described. A holding circuit for the switches B1 and B2 is established through an interlock 117 carried by the switch B1. The energizing circuit for the switch L extends from the conductor 116, through an interlock 120 on the switch B1, conductor 78 and the actuating coil of the switch L to negative.

During coasting the generated current is maintained at a relatively low value by the action of the accelerator A which is under the control of the limit relay LR during coasting, the relay LR being operated by the spotting coil 49 which is connected across the resistor 51 which is in the motor circuit at this time. The spotting coil 49 is designed to operate the relay at a relatively low value of current and the electromagnets 56 and 57 are deenergized at this time to remove the tension from the springs 54 and 55. The energizing circuit for the spotting coil 49 may be traced from one terminal of the resistor 51, through conductor 118, an interlock 119 on the switch G, conductor 121, the spotting coil 49, conductor 122, contact members 123 of the relay BR, conductor 124 to the other terminal of the resistor 51.

Since the current generated by the machines 10 and 11 during coasting is proportional to the speed of the vehicle, this current may be utilized for spotting the accelerator A, that is matching the position of the accelerator with the speed of the vehicle, thereby insuring that the accelerator will be in the proper position for the utilization of dynamic braking to decelerate the car. As previously explained, the accelerator is under the control relay of the limit relay LR during coasting. The contact members of the limit relay are so connected in the circuit for the pilot motor that the motor may be operated in either direction depending upon the speed of the car. Thus, with the contact members 82 and 83 closed, the pilot motor advances the accelerator to decrease the resistance in the motor circuit until the point is reached at which the motor current is sufficient to operate the relay LR to open the contacts 82 and 83. Should the car decrease in speed, which would result in lower motor current, the contact members 82 and 83 are closed to further advance the accelerator.

However, should the car increase in speed during coasting, resulting in a sufficient increase in the motor current to cause the contact member 82 to engage a contact member 125 of the relay LR, the pilot motor will be operated in the reverse direction to return the accelerator towards its initial position, thereby increasing the resistance in the motor circuit and matching the position of the accelerator with the speed of the car. The circuit for forward operation of the pilot motor may be traced from positive, through the resistor 79, conductor 81, tickler coil 53, contact members 82 and 83, conductor 84, contact members 126 of the relay CR, conductor 86, interlock 87 on the switch M2, conductor 88, the segment 64 on the drum switch 62, conductor 89, the "on" field winding 45 of the pilot motor and the armature winding 44 to ground. The circuit for reverse operation extends from the contact member 125 through conductor 102 to the drum switch 62 and thence to the pilot motor, as previously traced.

As explained hereinbefore, the relay CR is utilized to permit operation of the accelerator during coasting and braking but to prevent its advancement while the vehicle is standing still. The operating coil for the relay CR is connected across one motor to ground, thereby being energized by the counter-electromotive force of the motor which is dependent upon the speed of rotation of the motor. The energizing circuit for the coil of the relay CR may be traced from one terminal of the armature 14 of the motor 11 through the coils 47 and 48 of the relay LR, conductor 127, the switch B1, conductor 124, the resistor 51, conductor 118, interlock 119 on the switch G, conductor 121, the coil of the relay CR, conductor 128, contact members 129 of the relay BR, conductor 131 and an interlock 132 on the switch G to ground.

Thus, it will be seen that while the vehicle is moving the relay CR is energized to close its contact members 126, thereby permitting the limit relay LR to spot the accelerator in the manner herein described. However, when the vehicle is standing, the relay CR is deenergized and the circuit for the forward operation of the motor PM is interrupted by the opening of the contact members 126 which prevents the accelerator from being advanced as a result of an operation of the relay LR which, of course, would normally operate to advance the accelerator since the motor current is below the setting of the spotting coil 49 of the relay.

Furthermore, when the relay CR is deenergized, a circuit is established to operate the accelerator in the reverse direction to return it to its initial position. This circuit may be traced from the conductor 81, through an interlock 133 on the switch LS, conductor 134, contact members 135 of the relay CR, conductor 102, and thence through a circuit previously traced to the pilot motor PM.

In the event that dynamic braking is required to decelerate the vehicle, the controller BC is actuated to one of the braking positions, thereby energizing the relay BR to disconnect the spotting coil 49 on the limit relay LR and to connect the rate coil 52 across the resistor 51 in series-circuit relation with a resistor 68. In this manner the limit relay LR is recalibrated for proper operation during dynamic braking, since the rate coil 52 opposes the action of the coils 47 and 48 on the relay. The relay CR is also recalibrated by the opening of the contact members 129 on the relay BR to insert a resistor 137 in the circuit for the coil of the relay CR. The energizing circuit for the actuating coil of the relay BR may be traced from the previously energized conductor 114, through a segment 138 on the controller BC, conductor 139, an interlock 141 on the switch B1, conductor 142, and the actuating coil of the relay BR to negative.

During braking, the calibration of the relay LR is governed by the energization of the rate coil 52 which is connected across the resistor 51, through a circuit which may be traced from one terminal of the resistor 51, through conductor 118, the interlock 119 on the switch G, conductor 121, contact members 144 on the relay BR, conductor 145, the resistor 68, conductor 146, the rate coil 52 and conductor 124 to the other terminal of the resistor 51.

As explained hereinbefore, the operation of the braking controller BC to one of the braking positions admits air pressure to the braking system and to the relay C, the pressure depending upon the position to which the controller is actuated. When air pressure is applied to the relay C its contact members are closed to shunt portions of the resistor 68 from the circuit for the rate coil 52, the amount of resistance being shunted depending upon the pressure applied to the relay C. The shunting of the resistor 68 changes the calibration of the relay LR, thereby controlling the dynamic braking rate. Thus, if maximum braking effect is desired by the operator, in which event he will operate the brake controller to provide maximum air pressure, the relay LR is automatically calibrated to provide maximum dynamic braking effect on the vehicle, thereby securing the maximum total braking effect possible. In this manner the air-brake system and the electrical or dynamic braking system are coordinated at all times and the total braking effect on the vehicle is under the control of the operator.

It will be noted that the switch M2 is closed in the event that the accelerator is fully advanced to shunt the resistors 58 and 59 from the motor circuit during dynamic braking in a manner similar to that during acceleration of the vehicle. The energizing circuit for the actuating coil of the switch M2 extends from the previously energized conductor 142, through an interlock 147 on the switch B2, conductor 97, the actuating coil of the switch M2, conductor 98, and thence to negative at the drum switch 62 as previously traced.

While I have illustrated and described my control system as being applied to a vehicle controlled by a motor driven accelerator, it will be understood that the present system is clearly applicable to a system in which the acceleration and dynamic braking of the vehicle are controlled by unit switches, the operation of which is controlled by a current limit relay in a manner well known in the art.

Furthermore, it is to be understood that the present system may be readily applied to the control of a plurality of vehicles operating in trains, the equipment on each vehicle being a duplicate of that illustrated and described. The vehicles are electrically connected by a group of train line wires, as indicated in the present drawing. The air-brake system is connected between vehicles in the usual manner.

From the foregoing description, it is apparent that I have provided for the coordination of the air and the electrical braking systems in a simple and effective manner which does not increase the number of train line wires required for controlling a plurality of vehicles and which does not materially increase the equipment required for controlling the operation of the vehicles.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle having an air-brake system, a power conductor, switching means for connecting the motor to the power conductor to accelerate the vehicle, additional switching means for establishing dynamic braking connections for the motor to decelerate the vehicle, relay means responsive to the motor current for controlling the rates of acceleration and deceleration of the vehicle, and means responsive to the pressure in the air-brake system for controlling the operation of said relay means.

2. In a motor control system, in combination, a motor for propelling a vehicle having an air-brake system, a power conductor, switching means for connecting the motor to the power conductor to accelerate the vehicle, additional switching means for establishing dynamic braking connections for the motor to decelerate the vehicle, relay means responsive to the motor current for controlling the rates of acceleration and deceleration of the vehicle, and a relay responsive to variations in the pressure in the air-brake system for controlling the operation of said relay means.

3. In a motor control system in combination, a motor for propelling a vehicle having an air-brake system, a power conductor, switching means for connecting the motor to the power conductor to accelerate the vehicle, additional switching means for establishing dynamic braking connections for the motor to decelerate the vehicle, control means for controlling the motor current during acceleration and deceleration of the vehicle, relay means responsive to the motor current for controlling the operation of said control means, and an air pressure relay responsive to the pressure in the air-brake system for controlling the operation of said relay means.

4 In a motor control system, in combination, a motor for propelling a vehicle having an air-brake system, a power conductor, switching means for connecting the motor to the power conductor to accelerate the vehicle, additional switching means for establishing dynamic braking connections for the motor to decelerate the vehicle, control means for controlling the motor current during acceleration and deceleration of the vehicle, relay means responsive to the motor current for controlling the operation of said control means, and an air pressure relay having contact members actuated in sequential relation by the pressure in the air-brake system for controlling the operation of said relay means.

5. In a motor control system, in combination, a motor for propelling a vehicle having an air-brake system, a power conductor, switching means for connecting the motor to the power conductor to accelerate the vehicle, additional switching means for establishing dynamic braking connections for the motor to decelerate the vehicle, control means for controlling the motor current during acceleration and deceleration of the vehicle, relay means responsive to the motor current for controlling the operation of said control means, a controller for varying the pressure in the air-brake system of the vehicle, and means responsive to the pressure in the air-brake system for controlling the operation of said relay means.

6. In a motor control system, in combination, a motor for propelling a vehicle having an air-brake system, a power conductor, switching means for connecting the motor to the power conductor to accelerate the vehicle, additional switching means for establishing dynamic braking connections for the motor to decelerate the vehicle, control means for controlling the motor current during acceleration and deceleration of the vehicle, relay means responsive to the motor current for controlling the operation of said control means, a controller for varying the pressure in the air-brake system of the vehicle, and means responsive to the pressure in the air-brake system for controlling the operation of said relay means, said controller also controlling the operation of the switching means for establishing dynamic braking connections for the motor.

7. In a motor control system, in combination, a motor for propelling a vehicle having an air-brake system, a power conductor, switching means for connecting the motor to the power conductor to accelerate the vehicle, a master controller for controlling the operation of said switching means, additional switching means for establishing dynamic connections for the motor to decelerate the vehicle, control means for controlling the motor current during acceleration and deceleration of the vehicle, relay means responsive to the motor current for controlling the operation of said control means, said master controller also controlling the operation of said relay means during acceleration of the vehicle, a braking controller for varying the pressure in the air-brake system, and means responsive to the pressure in the air-brake system for controlling the operation of said relay means during deceleration of the vehicle.

8. In a motor control system, in combination, a motor for propelling a vehicle having an air-brake system, a power conductor, switching means for connecting the motor to the power conductor to accelerate the vehicle, a master controller for controlling the operation of said switching means, additional switching means for establishing dynamic connections for the motor to decelerate the vehicle, control means for controlling the motor current during acceleration and deceleration of the vehicle, relay means responsive to the motor current for controlling the operation of said control means, said master controller also controlling the operation of said relay means during acceleration of the vehicle, a braking controller for varying the pressure in the air-brake system, and means responsive to the pressure in the air-brake system for controlling the operation of said relay means during deceleration of the vehicle, said braking controller also controlling the operation of the switching means for establishing dynamic braking connections for the motor.

GEORGE R. PURIFOY.